United States Patent [19]

Meyer

[11] Patent Number: 4,996,744
[45] Date of Patent: Mar. 5, 1991

[54] SHRIMP PROCESSING MACHINE

[76] Inventor: Grant C. Meyer, 2910 Lower Chiles Valley Rd., St. Helena, Calif. 94574

[21] Appl. No.: 477,032

[22] Filed: Feb. 8, 1990

[51] Int. Cl.$^5$ .............................................. A22C 29/02
[52] U.S. Cl. ............................................ 452/3; 452/5
[58] Field of Search .......................... 17/73, 72, 48, 71

[56] References Cited

U.S. PATENT DOCUMENTS

| | | | |
|---|---|---|---|
| 3,566,437 | 3/1971 | Jonsson | 17/72 |
| 4,281,436 | 8/1981 | Hoffman et al. | 17/73 |
| 4,472,858 | 9/1984 | Keith | 17/72 |
| 4,769,871 | 9/1988 | Betts | 17/73 |
| 4,843,683 | 7/1989 | Grammer | 17/48 |

Primary Examiner—Willis Little
Attorney, Agent, or Firm—Larry D. Johnson

[57] ABSTRACT

A shrimp processing machine provides an apparatus to shell and devein a fresh (headless) shrimp. The machine comprises a motor housing, a carrier wheel bearing a plurality of tine elements, a guide member, a feed member, a blade member, and a shrimp extractor member. The carrier wheel is preferably turned about its axis by a small motor in the motor housing, and carries the shrimp past the blade for shell and vein removal.

11 Claims, 1 Drawing Sheet

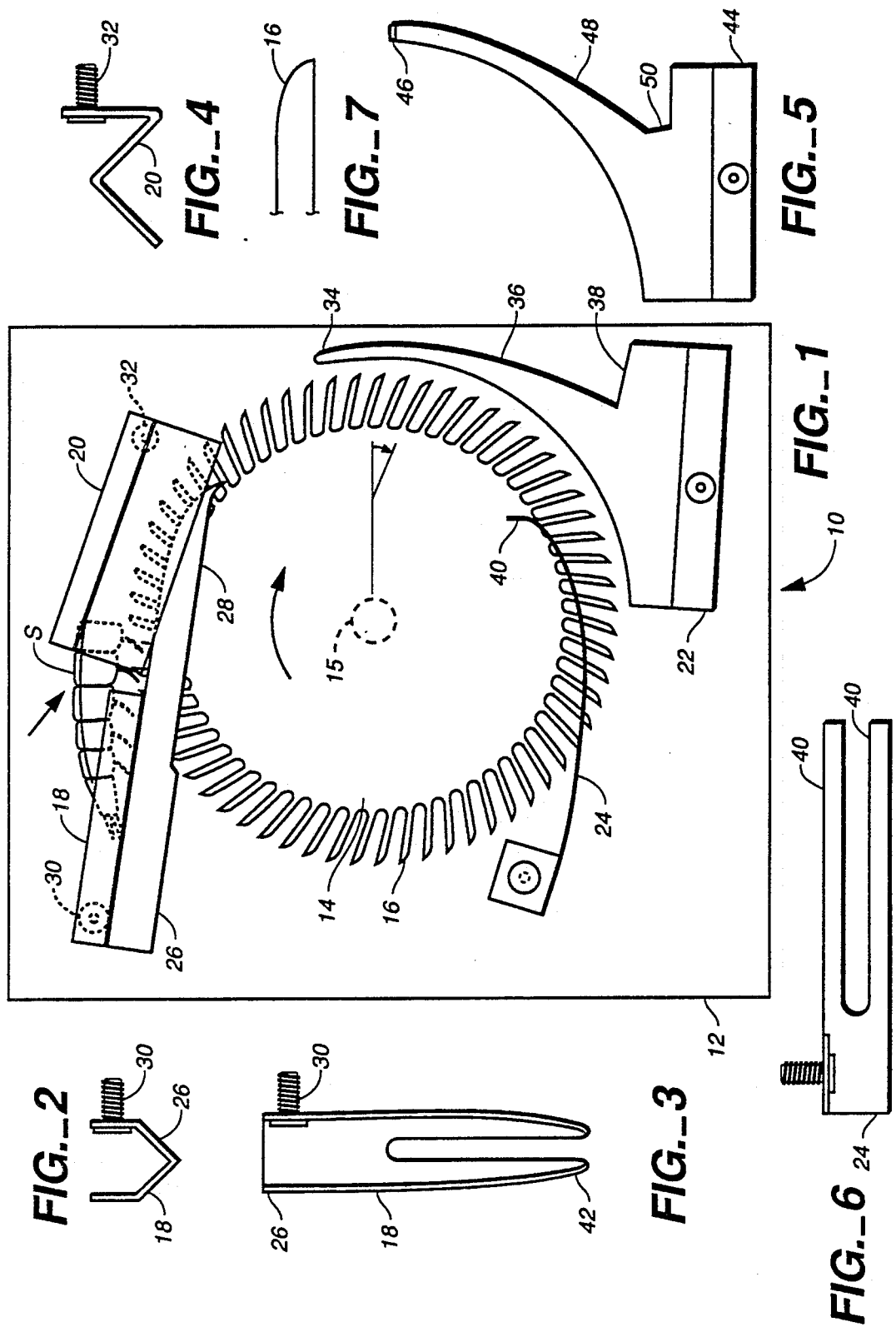

SHRIMP PROCESSING MACHINE

BACKGROUND OF THE INVENTION

1. Field of the Invention

This invention relates generally to food processing equipment and related machines, and more specifically to an improved shrimp processing machine used to shell and devein fresh shrimp.

2. Description of the Prior Art

Most common varieties of edible shrimp have six shell segments, the last segment bearing appendages called telson and uropods; an intestinal tract ("vein") inside the meat; and pleopods ("legs") or swimmerettes. The sixth shell segment and its attached telson and uropods are collectively referred to as the tail portion of the shrimp. Only the meat of the shrimp is generally considered to be edible, so the shell segments and various appendages must typically be removed from the shrimp before consumption.

Edible shrimp retains its flavor and texture best when these shell segments and appendages are removed just prior to its use (e.g., cooking). In addition, many consumers prefer that the vein or intestinal tract of the shrimp also be removed before consumption. Unfortunately, manual removal of the shell and vein tend to be labor-intensive tasks, adding greatly to the cost of the finished and prepared food product.

Numerous machines have been developed to process (i.e., shell and devein) such edible shrimp for large-scale commercial use. However, these machines are generally complicated, cumbersome and expensive, and therefore often unsuitable for use in markets, restaurants or in homes. Other known prior art shrimp processing machines require the shrimp to be manually fed into the machine in particular synchronization with a cutting blade, which requires additional effort and slows processing time.

SUMMARY OF THE INVENTION

The shrimp processing machine of this invention provides a machine to shell and devein a fresh (headless) shrimp. The machine comprises a motor housing, a carrier wheel bearing a plurality of tine elements, a guide member, a feed member, a blade member, and a shrimp extractor member. The carrier wheel is preferably turned about its axis by a small motor in the motor housing.

The machine operates in the following manner: a headless shrimp is placed onto the carrier wheel proximate the entry end of the guide member. As the carrier wheel rotates, the tine elements draw the shrimp forward toward the feed member, and then between the feed member and the bifurcated delivery end of the guide member, thereby constricting the shrimp onto the tines of the carrier wheel. A guide member pivot adjustment and feed member pivot adjustment adjust for correct shrimp depth onto the carrier wheel, i.e., penetration of the tines into the body of the shrimp. The carrier wheel rotates to bring the shrimp at the correct depth for the blade tip of the blade member to push into the shrimp body at the vein and under the dorsal meat and shell, and then to push back along the shrimp.

When the tail-removing version of the blade member is used, the blunt blade tip goes along the vein to the end of the shrimp and out of the tail, removing the tail as it goes. Alternatively, when the tail-retaining version of the blade member is used, the sharp blade tip exits the shrimp body before the tail portion, and the tail portion is left intact on the shrimp.

A sharp edge zone on the back side of the blade member then cuts the dorsal meat of the shrimp, and an angle portion of the blade member acts to push the shell off the shrimp. The shrimp now rotates out from under the blade member and toward the shrimp extractor member, where the angle of the bifurcated arms of the extractor member relative to the carrier wheel tine elements eases the shrimp off of the carrier wheel, and additionally separates the pleopods from the shrimp. The shelled and deveined shrimp meat then falls out the bottom of machine beneath the extractor member, while the shell falls off at the blade angle. Further shrimp may be continuously fed into the machine in the same manner.

The shrimp processing machine of this invention thus provides an innovative machine that shells and deveins headless shrimp at a high speed, and as quickly as they are fed into the machine. The machine can be adjusted so that it will remove the shrimp tail, or leave the tail attached to the body of the shrimp. The machine is a highly efficient and uncomplicated mechanism and therefore more economical to use and easier to operate than any previous machine developed for this purpose. It can be readily adapted for use in large and small production facilities as well as for markets, restaurants, and individual consumers.

BRIEF DESCRIPTION OF THE DRAWINGS

FIG. 1 is a side elevation view of a shrimp processing machine of this invention in operation to shell and devein a fresh (headless) shrimp, and illustrating the structural arrangement and relationship of the components of the machine including a motor housing, a carrier wheel bearing a plurality of tine elements, a guide member, a feed member, a tail-removing version of a blade member, and a shrimp extractor member;

FIG. 2 is an end elevation view of the continuous entry end of the guide member of the shrimp processing machine of this invention;

FIG. 3 is a top plan view of the guide member of the shrimp processing machine of this invention, illustrating the continuous entry end and bifurcated delivery end;

FIG. 4 is an end elevation view of the feed member of the shrimp processing machine of this invention;

FIG. 5 is a side elevation view of an alternate version of a blade member of the shrimp processing machine of this invention, this for a tail-retaining version of a blade member adapted to leave the tail portion of the shrimp intact on the shrimp;

FIG. 6 is a top view of the shrimp extractor member of the shrimp processing machine of this invention; and FIG. 7 is an enlarged side view of a single tine element of the carrier wheel of the shrimp processing machine of this invention.

DETAILED DESCRIPTION OF A PREFERRED EMBODIMENT

FIG. 1 is a side elevation view of a shrimp processing machine 10 of this invention in operation to shell and devein a fresh (headless) shrimp S, and illustrating the structural arrangement and relationship of the components of the machine including a motor housing 12, mounted on which is a carrier wheel 14 bearing a plurality of tine elements 16, a guide member 18, a feed member 20, a tail-removing version of a blade member 22, and a shrimp extractor member 24.

The carrier wheel 14 is turned about its axis 15 by a small motor (not shown) in the motor housing, e.g., a 1/60th horsepower electric motor operating at approximately fifty r.p.m. Alternatively, the carrier wheel may be rotated by a hydraulic or other motor, or even be manually (e.g., hand crank) operated. The size of the carrier wheel can of course vary, but a wheel approximately five and one-half inches in diameter has been found to be a suitable size for most applications. Proper selection of the size of the carrier wheel and its associated components permits a plus or minus fifty percent variation in the size of the shrimp to be processed. The tine elements are preferably radially inclined forward (clockwise) on the circumferential edge of the carrier wheel.

The shrimp processing machine operates in the following manner: a headless shrimp S is placed (front end first, dorsal side up) onto the carrier wheel 14 proximate entry end 26 of guide member 18. As the carrier wheel rotates clockwise, the tine elements 16 draw the shrimp forward toward the feed member 20, and then between the feed member and the bifurcated delivery end 28 of guide member 18, thereby constricting and centering the shrimp onto the tines of the carrier wheel. Guide member pivot adjustment 3 and feed member pivot adjustment 32 adjust for correct shrimp depth onto the carrier wheel, i.e., penetration of the tines into the body of the shrimp. The carrier wheel rotates to bring the shrimp at the correct depth for the blunt blade tip 34 of tail-removing blade member 22 to push into the vein and under the dorsal meat and shell, and then to push back along the shrimp. When this tail-removing blade member is used, the blade is curved such that it goes along the vein to the end of the shrimp and out of the tail, removing the tail as it goes.

The sharp edge zone 36 on the back side of tail-removing blade member 22 then cuts the dorsal meat of the shrimp, and the basal angle portion 38 of the blade member acts to push the shell off the shrimp. The shrimp now rotates out from under the blade member and toward the shrimp extractor member 24, where the angle of the bifurcated arms 40 of the extractor member relative to the carrier wheel tine elements 16 eases the shrimp off of the carrier wheel, and additionally separates the pleopods from the shrimp. The shelled and deveined shrimp meat then falls out the bottom of machine beneath the extractor member, while the shell falls off at the blade basal angle portion 38. Further shrimp may be continuously fed into the machine in the same manner.

FIG. 2 is an end elevation view of the continuous entry end 26 of the guide member 18 of the shrimp processing machine of this invention. As can be seen in this view, the guide member provides a steep-sided, generally V-shaped trough or channel for support and alignment of the headless shrimp being fed into the machine. Guide pivot adjustment 30 may consist simply of a locking screw to enable angular adjustment of the guide member relative to the carrier wheel.

FIG. 3 is a top plan view of the guide member 18 of the shrimp processing machine of this invention, illustrating the continuous entry end 26 and bifurcated delivery end 42. This bifurcation is necessary to permit passage of the rotating tine elements of the carrier wheel, which tine elements penetrate and capture the shrimp being processed.

FIG. 4 is an end elevation view of the feed member 20 of the shrimp processing machine of this invention. This view illustrates that the feed member provides a generally inverted V-shaped trough or channel for alignment of the shrimp as it is carried towards the blade member, and compression of the shrimp body down onto the carrier wheel tines. Feed pivot adjustment 32 may consist of a locking screw to enable angular adjustment of the feed member relative to the carrier wheel (similar to the guide member pivot adjustment, supra).

FIG. 5 is a side elevation view of an alternate version of a blade member of the shrimp processing machine of this invention, this for a tail-retaining version 44 of a blade member adapted to leave the tail portion of the shrimp intact on the shrimp. With proper alignment, the sharp edged blade tip 46 pushes back the vein of the shrimp and emerges out of the shell after the fifth segment and before the sixth segment, thus leaving the tail intact. Sharp edge zone 48 and basal angle portion 50 operate analogously to their tail-removing blade member counterparts, described supra. This tail-retaining blade member is wider and angled so as to exit the shrimp before the tail.

FIG. 6 is a top view of the shrimp extractor member 24 of the shrimp processing machine of this invention. This view illustrates the bifurcated arms 40 that are positioned on opposite sides of the carrier wheel. These arms act to remove the shrimp from the carrier wheel, as well as to remove the pleopods from the shrimp by splitting the two apart.

FIG. 7 is an enlarged side view of a single tine element 16 of the carrier wheel 14 of the shrimp processing machine of this invention. These tine elements are preferably generally straight on their front (leading) edge, and gently curved on their back (trailing) edge, for improved penetration of and removal from the shrimp body.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A shrimp processing machine for removal of the shell portion, vein portion and pleopods of a headless shrimp, said shrimp having a front end and a dorsal side, said processing machine comprising:

a housing portion;

a carrier wheel mounted on said housing portion, said carrier wheel bearing a plurality of radially-extending tine elements, said carrier wheel conditioned for rotation about an axis;

a guide member mounted on said housing portion, said guide member having an entry end and a delivery end;

a feed member mounted on said housing portion adjacent said guide member delivery end;

a blade member mounted on said housing portion, said blade member bearing a blade tip portion, an edge portion and a basal angle portion; and a shrimp extractor member mounted on said housing, wherein when said carrier wheel is rotated about said axis and a headless shrimp is placed front end first and dorsal side up onto said carrier wheel proximate said guide member entry end, said carrier wheel tine elements draw said shrimp between said feed member and said guide member delivery end, constricting said shrimp onto said carrier wheel tine elements; said shrimp is further carried to said blade member so that said blade tip portion enters said shrimp into said vein portion and along said dorsal side, said blade edge portion cuts the dorsal meat of said shrimp, and said basal angle portion pushes the shell off of said shrimp; and said shrimp is further carried to contact with and removal from said carrier wheel by said shrimp extractor member.

2. The shrimp processing machine of claim 1 wherein said carrier wheel radially-extending tine elements are inclined radially forward on the circumferential edge of said carrier wheel in the direction of said rotation.

3. The shrimp processing machine of claim 1 wherein said carrier wheel tine elements each have a front edge and a back edge, said front edges being generally straight and said back edges being gently curved.

4. The shrimp processing machine of claim 1 wherein said guide member entry end is generally V-shaped.

5. The shrimp processing machine of claim 1 wherein said guide member delivery end is bifurcated to permit passage of said carrier wheel.

6. The shrimp processing machine of claim 1 wherein said feed member defines a generally inverted V-shaped trough.

7. The shrimp processing machine of claim 1 wherein said shrimp includes a tail portion, and wherein said blade member tip is blunt and curved to penetrate and travel through said shrimp body to said tail portion, and to remove said tail portion from said shrimp as said shrimp is carried past said blade member by said carrier wheel.

8. The shrimp processing machine of claim 1 wherein said shrimp includes a tail portion, and wherein said blade member tip bears a sharp edge and said blade member is curved to penetrate and travel through said shrimp body to the end of said shrimp dorsal side adjacent said tail portion, and to leave said tail portion on said shrimp as said shrimp is carried past said blade member by said carrier wheel.

9. The shrimp processing machine of claim 1 wherein said shrimp extractor member bears a pair of bifurcated arm portions positioned on opposite sides of said carrier wheel.

10. The shrimp processing machine of claim 9 wherein said shrimp extractor member bifurcated arm portions are aligned to split said pleopods from said shrimp as said shrimp is carried to contact said shrimp extractor member by said carrier wheel.

11. The shrimp processing machine of claim 1 including a motor member in said housing portion to rotate said carrier wheel about said axis.

* * * * *